United States Patent [19]

Canada et al.

[11] Patent Number: 4,520,674
[45] Date of Patent: Jun. 4, 1985

[54] VIBRATION MONITORING DEVICE

[75] Inventors: Ronald G. Canada; Kenneth R. Piety; Daniel G. Simpson, all of Knoxville; E. Forrest Pardue, Lenoir City, all of Tenn.

[73] Assignee: Technology for Energy Corporation, Knoxville, Tenn.

[21] Appl. No.: 551,338

[22] Filed: Nov. 14, 1983

[51] Int. Cl.³ .............................................. G01H 1/00
[52] U.S. Cl. ...................................... 73/660; 364/508
[58] Field of Search ................. 73/593, 658, 660, 661, 73/602; 364/508, 507, 576, 579, 580; 340/682, 683

[56] References Cited

U.S. PATENT DOCUMENTS

| | | | |
|---|---|---|---|
| 3,913,084 | 10/1975 | Bollinger | 73/660 |
| 4,417,336 | 11/1983 | Weilbacker | 364/580 |
| 4,426,641 | 1/1984 | Kurihara et al. | 73/660 |
| 4,429,578 | 2/1984 | Darrel et al. | 73/660 |

Primary Examiner—Stephen A. Kreitman
Attorney, Agent, or Firm—Pitts and Brittain

[57] ABSTRACT

A portable vibration monitoring device (10) for use in connection with a base computer (11) which stores data regarding the nature and parameters of vibration measurements to be made on preselected machines for predictive maintenance purposes. The device includes a power module (36) which energizes the various components. A vibration sensor (14) produces an analog signal which is representative of selected vibration parameters. The signal generated by the vibration monitor is conditioned by a signal conditioning module (16) which includes anti-aliasing filters which enhance the accuracy of the data collected. A multiple function module (18) includes various selectively energized modules which enhance the speed and reliability of the data collected. This data is analyzed by a microprocessor and displayed as desired.

16 Claims, 16 Drawing Figures

VIBRATION MONITORING DEVICE

TECHNICAL FIELD

This invention relates to a vibration measuring instrument and more particularly concerns a monitoring device for measuring, storing and/or analysing vibration data for rotating and reciprocating machines for predictive maintenance purposes.

BACKGROUND ART

Vibration surveys are commonly conducted on rotating and reciprocating equipment or machines to anticipate maintenance scheduling. Currently, two known techniques are used for the vibration monitoring of machines in industrial plants. The most common techique employs a portable analog meter which is carried to machine locations within a plant for making the vibration measurements. The meter sensor is mechanically connected to the machine being analyzed, and the meter provides a readout of the overall vibration level of the machine. This reading gives an indication of the magnitude of such machine vibration. The technician will normally write down the machine vibration readings and take this data to a skilled engineer who will analyze the information to determine if a machine is vibrating louder than usual. Inasmuch as a single overall measurement of the vibration magnitude is provided, this information can be unreliable. For example, the technician may have made a faulty measurement, or of no consequence may mask pertinent information.

A second state of the art approach for collecting machine vibration data, employs a tape recorder which records the vibration sound. The data sound is recorded on a portable tape recorder which is normally a bulky machine. This recording is normally taken back to a computer, for purposes of reviewing the characteristics of the machine vibration. This method is generally more accurate than the analog meter method since it provides "loudness" information together with information regarding how the machine was vibrating. This method, however, is expensive and time consuming. It can take several hours to accurately measure one machine in a plant which may have several or even several hundred machines, and particularly where a machine has a plurality of measurement points. Thus, in a plant employing numerous machines, a very intensive effort must be undertaken to gather the machine vibration data.

In accordance with various features of the present invention, a light weight and portable measuring device has been developed which serves to collect data in a reliable and rapid manner. The instrument is microprocessor based and is used in combination with a base computer which maintains a data base, provides for exception reporting and implements the detection and diagnosis of problems. The vibration levels for a given measurement are stored in digital form in the instrument's memory, and numerous measurements can be simultaneously stored. Moreover, data can be compressed by carefully selecting the measured parameters such that less memory can be used to store the pertinent measurement data. The contents of the memory can be transmitted directly to a base computer via an interface built into the instrument. Additionally, the instrument can use signature anaylsis to characterize the vibration of a machine. Vibration information contained within selected frequency bands can be recorded in the instrument's memory for subsequent analysis. Prior to storing the vibration data, the signal from the sensor is conditioned to enhance its reliability. Further, the components or modules of the unit are selectively energized to reduce power consumption. Other objects and advantages of the instrument will become apparent upon reading the detailed description together with the drawings described as follows.

DISCLOSURE OF THE INVENTION

In accordance with various features of the invention, a vibration monitoring device is provided. The instrument is portable and primarily intended for conducting on-site vibration surveys of rotating and reciprocating machines. This microprocessor based device includes a vibration sensor which is mechnically coupled, in the preferred embodiment, with a machine to be monitored at preselected locations for collecting vibration data. The device is intended to be used in conjunction with a base computer, which loads the device with information concerning the details of the vibration measurements to be made. The signal operated by the vibration sensor is conditioned to enhance its accuracy. In this connection, an anti-aliasing filter is used which comprises a switch capacitive filter in the preferred embodiment. Means are also provided for selectively energizing various modules of the device only when needed to assist in minimizing power consumption.

BEST MODE FOR CARRYING OUT THE INVENTION

Figure 1:
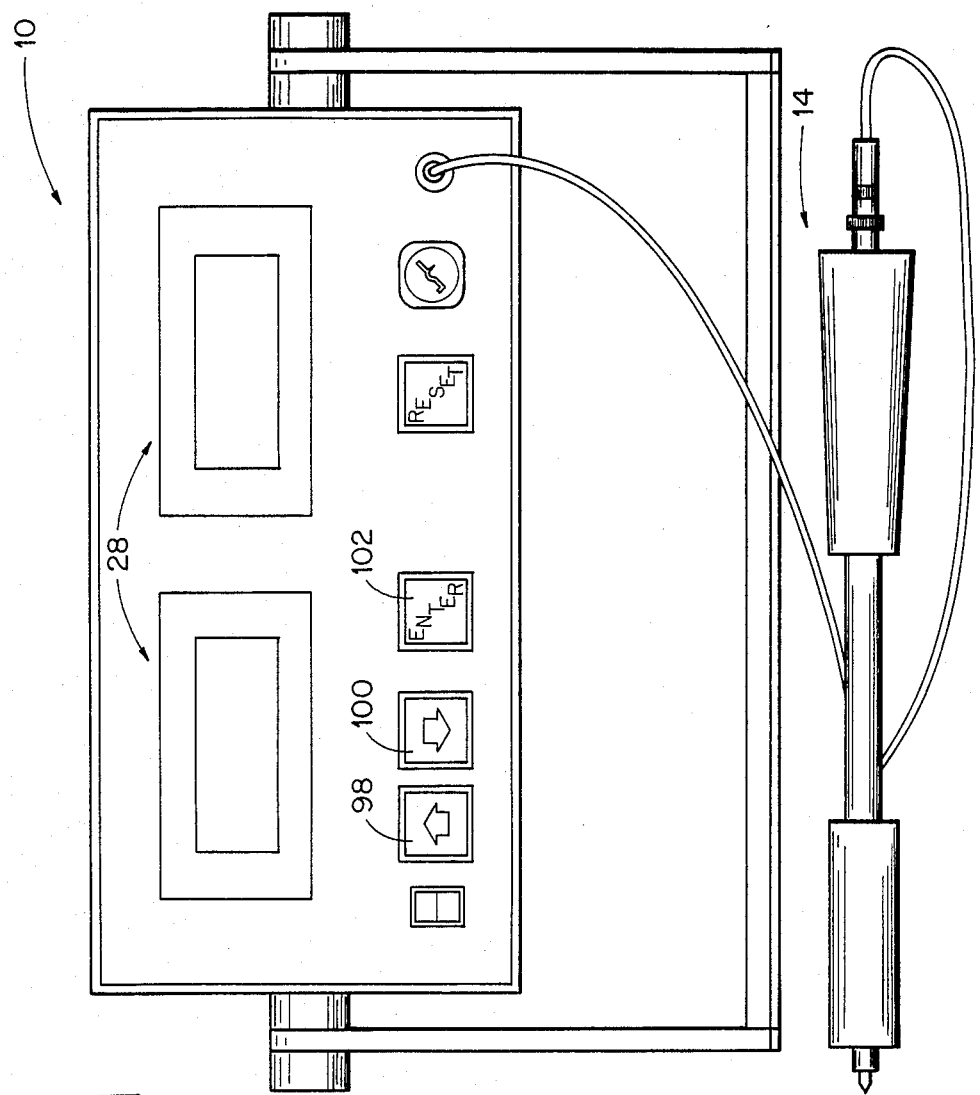
FIG. 1 illustrates an instrument constructed in accordance with various features of the present invention, and depicts the front panel of the instrument which is operated by a technician or other suitable operator.

Referring now to the drawings, a vibration measuring device constructed in accordance with various features of the present invention is illustrated generally at 10 in FIG. 1. In the preferred embodiment, this device is used in conjunction with a base computer 11 (see FIG. 4) of conventional design such as a state-of-the-art microcomputer. The base computer will contain certain appropriate state of the art software to allow communication with the device and to provide data storage and analysis functions. This base computer software can be developed by anyone skilled in the art. The base computer maintains a data base and contains specific information concerning the machines to be monitored by the device. This data base will contain as a minimum, information regarding the designation of the measurement point, the frequency band discrimination indexes, and the extent to which averaging of data is to be applied. As chosen by the software designer, the data base may include information such as how the machines are set up, how many blades there are on the machines, whether the machines are vertical pumps or horizontal pumps. For example, the turning speed of compressors will be stored in the memory of the base computer. Moreover, the data base may contain information regarding which parameters if a particular machine should be measured and the location of such measurement points.

The base computer reads information from its data base into the vibration monitoring device 10 through an interface to be described in greater detail hereinafter. This interface is connected through a suitable cable to the interface connection point on the back of the device illustrated at 10 in FIG. 1. At the commencement of a vibration monitoring survey, the operator will connect the device 10 with the base computer through this interface. The base computer 11 will then load such information about the measurements to be conducted into the device 10 from its data base. The device 10 will then be prepared to receive and organize data, which is a function of preselected parameters, from preselected points on the machines.

Thus, subsequent to the initial connection between the base computer and the device 10, the meter will have stored in its memory information regarding what measurements are to be made, which machines upon which the measurements are to be made, how the vibration data should be collected, what vibration information should be collected, and what information should be saved for analysis. After the data is collected by the operator, the device 10 is returned to the base computer, and the device is again connected to the base computer. At that point, information will be fed into the base computer regarding the results of the vibration measurements. Thus, the base computer collects this information for purposes of generating predictive maintenance information, which will be submitted to a skilled vibration technician or engineer.

Figure 2:
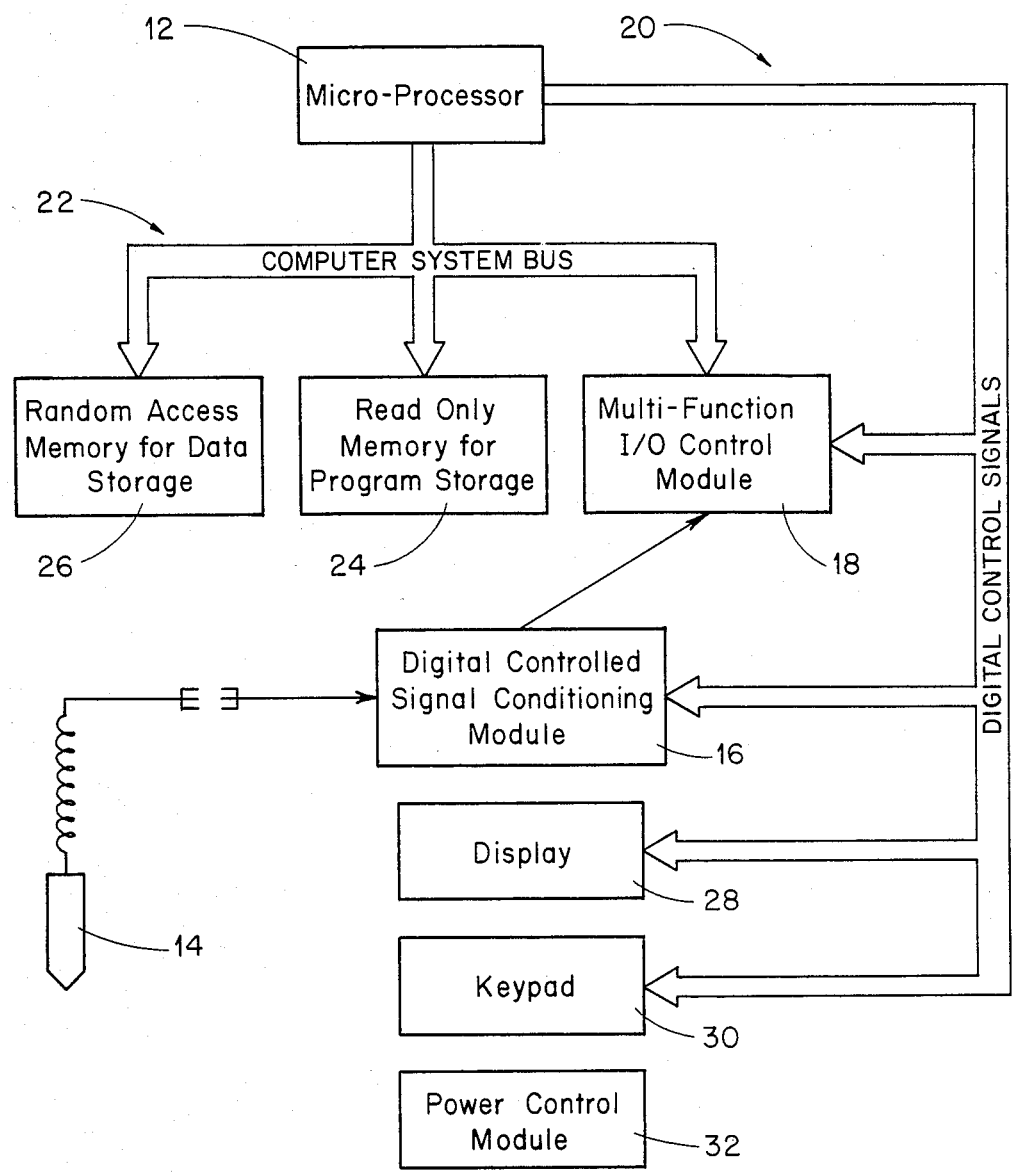
FIG. 2 illustrates a block diagram of the instrument depicted in FIG. 1.

The device 10 illustrated generally in the block diagram of FIG. 2, is a portable, battery powered unit, which includes a preferrably low power microprocessor 12 which is capable of performing the various desired processing operations of the device, including analysing the vibration data collected on site. The device 10 includes a hand held vibration sensor 14 illustrated in FIGS. 1 and 2. This sensor is of conventional design and comprises a piezoelectric accelerator in the preferred embodiment. It is mechanically connected at preselected locations to a machine undergoing vibration analysis. Information identifying measurement points or locations upon which measurements are taken are fed into the vibration measuring device 10 by the base computer, together with information concerning parameters which control frequency band discrimination and data averaging. Generally, the data collected by the device 10 is stored in its memory in digital form. The device 10 enables simple and rapid collection of detailed data, and one measurement may take approximately 30 seconds. Thus, vibration information for one machine can be collected from 8–10 measurement points within a few minutes. In comparison, it can take several hours to properly collect such information using conventional tape recording methods. Thus, the device allows an operator, who can be an unskilled technician, to obtain very sophisticated and accurate vibration data from rotating and reciprocating machines in an efficient manner. Upon returning the data to the base computer, a qualified engineer can review the analyzed data procurred by the device 10 to determine and anticipate maintenance problems.

FIG. 2 illustrates a block diagram of the device 10 indicated in FIG. 1. The hand held vibration sensor 14 is connected by an operator to a point on the machine from which vibration data is to be collected. This sensor generates an analog vibration signal which is fed into the signal conditioning module 16. Thus, the input of the signal conditioning module is the unconditioned vibration signal produced by the probe or sensor 14. Its output is a conditioned analog signal which is fed into the multiple function control module 18. As will be described in greater detail hereinafter, the signal conditioning module 16 amplifies the vibration signal as a preliminary step for digitization. Moreover, this module 16 includes an anti-aliasing filter which assists in preventing the loss of pertinent information due to the passage of high frequency information into the analog-to-digital converter. Use of a low pass switch capacitive filter for the anti-aliasing filter has been found to be particularly suitable since its use assists in maintaining a light weight device with flexible signal conditioning capability.

In the preferred embodiment, an eight-pole digitally controlled switch capacitive filter has been used with desired results. Information from the signal conditioning modules 16 is fed through the data control bus generally indicated at 20 into the multiple function I/O module 18, which converts the conditioned analog signal into a digital signal, among its other functions addressed below. This digital signal is accessible by the computer for determining vibration information, such as the nature of the machine vibration. Data from the multifunction control module 18 is accessed by the computer through the data bus generally indicated at 22.

The read only memory (ROM) module 24 serves to store the firmware for the device operation. Data collected by the device 10 is stored in the random access memory module (RAM) 26.

The analog voltage signal representative of the vibration measurement is fed into the module 18 and digitized. The processor 12 analyses the digital information concerning the vibration data, stores the information in its memory, and interfaces with the operator by displaying the results in the display 28. Information is fed by the operator into the device through the key pad 30 of conventional design.

A power control module 32 serves to provide power for each of the modules of the device 10 illustrated in FIG. 2. This power control module 32 is designed to selectively energize the various modules for purposes of conserving battery power. Thus, when modules or sections of the device are not in use, they are powered down, thereby reducing the device power consumption without the normal trade-off of losing device operational speed normally associated with low power devices.

Figure 3:
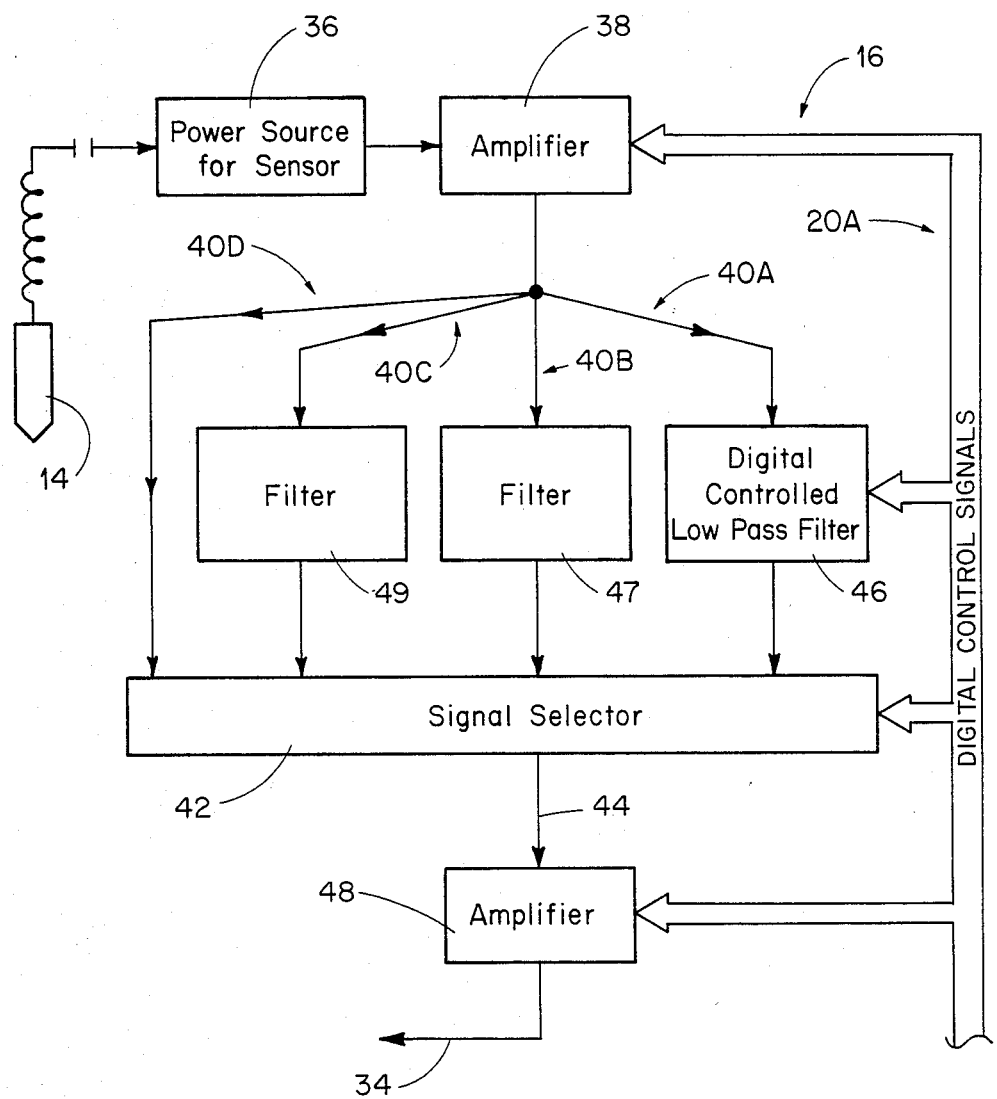
FIG. 3 illustrates a block diagram of the signal conditioning module illustrated in FIG. 2.

FIG. 3 illustrates a block diagram of the digital controlled signal conditioning module 16 illustrated in FIG. 2. The input to the signal conditioning module 16 is the unconditioned vibration signal generated by the hand held vibration sensor 14, which is mechanically connected to the machine. The output, as generally described above, is a conditioned vibration signal generated at the location 34 which can be analyzed by the computer subsequent to digitization. The constant current power module 36 provides the power for the sensor 14. The vibration signal is fed into the digitally controlled amplifier 38 which converts a few millivolt signal, representative of the vibration measurement, into a few volt signal which attenuates the effect of electronic noise on the signal. The output of the amplifier follows one of the four independent paths 40A-D to a signal selection device 42 which comprises a multiplexer in the preferred embodiment. The multiplexer 42, as are the various other components of the signal control module 16, is under computer control through the data control bus 20A illustrated in FIG. 3. This signal selection device 42 chooses one of the signals from the input paths 40A-D to be fed to its output 44. The computer controls which input signal is fed to the output 44.

Thus, there are four independent paths from which the computer can select data for being fed to the output 44. In the preferred embodiment, the signal through the path 40A is fed through the multiplexer 42 the vast majority of the time by computer control. This path 40A includes a digital controlled low pass filter illustrated in the block diagram at 46. This filter 46 is a low pass anti-aliasing filter. It has been found that an eight-pole, digitally controlled switch capacity filter is a suitable low power, light weight filter for providing portable yet flexible signal conditioning. This anti-aliasing filter 46 filters frequencies above a preselected range to eliminate spurious information, which could otherwise result in improper digitization of data by the computer. Thus, the anti-aliasing filter 46 enhances the ability of the device 10 to quantify the vibration characteristics of the machine under surveillance.

The paths 40B-C, when chosen by computer control for feeding or producing the output 44 of the signal selection device 42, allow the computer to measure the overall root mean squared of the vibration in two discrete frequency bands. In the preferred embodiment, path 40B is a four-pole band pass filter set between 250 Hz and 1.25 KHz. The path 40C includes a four-pole high pass filter set at 1.25 KHz in the preferred embodiment. Thus, the computer can select data regarding the vibration from two discrete bands to be fed into the digital controlled amplifier 48, if the output from the paths 40B or 40C are fed through the multiplexer 42.

Thus, of the four paths to the multiplexer, two paths 40C-D are used for an overall single point root mean squared measurement of the vibration within each of two preselected discrete frequency bands. The straight through path 40D, which causes no signal conditioning between the amplifier 38 and the multiplexer 42, enables the device 10 under computer control to determine the output of the amplifier 38. The output of the filter 46 in path 40A, is a time varying vibration signal upon which the computer performs analysis, including Fourier analysis to analyze the detailed characteristics of the vibration.

As indicated in FIG. 3, the output of the signal selection device or multiplexer 42 is fed through a digital controlled amplifier 48 which amplifies the signal sufficiently such that it can be digitized by the computer with good dynamic resolution. The output of this amplifier 48 is the conditioned vibration signal which is fed into the analog-to-digital converter which comprises a section of the multifunction I/O module 18 illustrated in FIG. 2 and to be described in greater detail hereinafter. This is the conditioned signal which is digitized by the computer.

Figure 4:
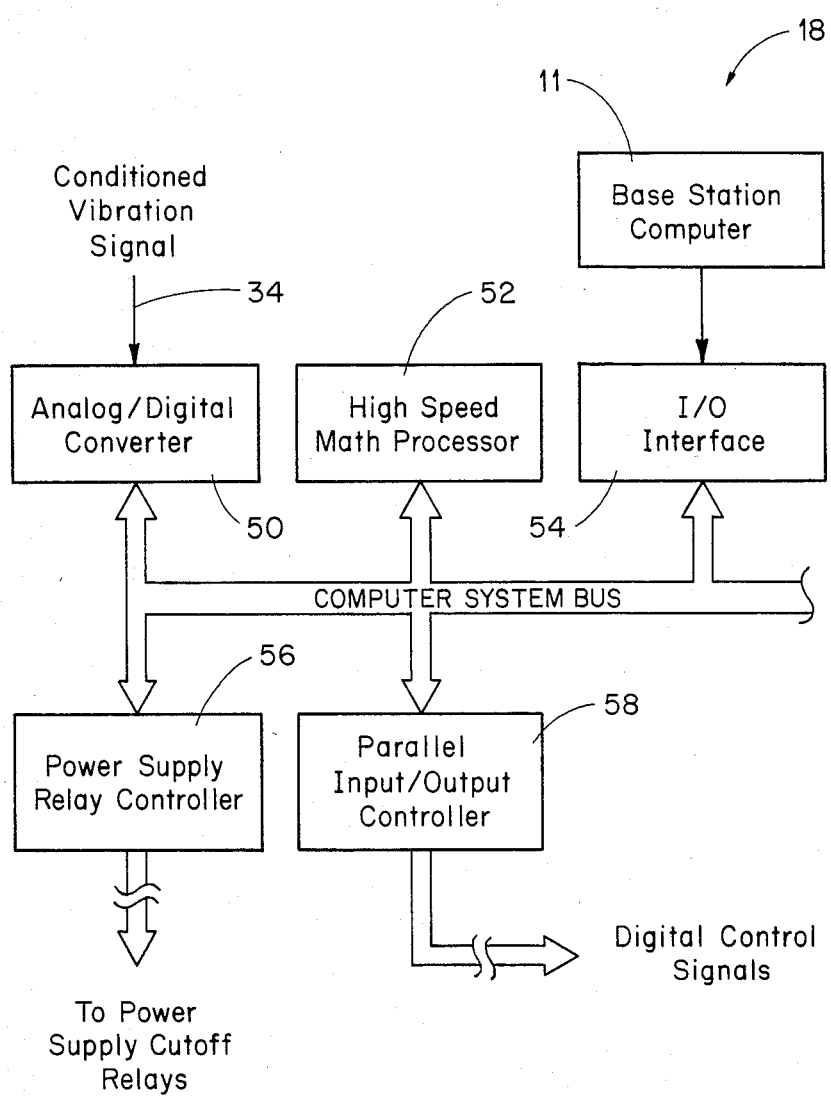
FIG. 4 illustrates a block diagram of the multifunction I/O module illustrated in FIG. 2.

The multifunction I/O module illustrated in FIG. 2 at 18 is set forth in greater detail in the block diagram of FIG. 4. This module serves to interface the microprocessor 12 with the various other parts of the device such that the processor can control the different components of the device. As illustrated, the module 18 performs basically five functions, in the preferred embodiment, and includes an analog to digital converter 50 which receives the output 34 of the signal conditioning module and converts this analog signal into a digital signal. This analog/digital conversion enables the computer to read the digital signal directly for purposes of analysing data generated by the device. The module 18 also includes a high speed math processor 52, which enhances the speed with which the numerical analysis of the data is performed. For example, during the analysis of the data, the microprocessor 12 performs Fourier analysis, multiplication, division, integration, etc. In order to maintain low power consumption, the computer utilizes a relatively slow computer. Low power conventionally dictates that the computer will be relatively slow in performing mathmatical analysis. The mathmatical analysis can be conducted more rapidly by employing the high speed math processor 52. However, this processor 52 uses substantial power. In order to overcome this potential problem, the processor 52 is selectively engerized by the processor 12; thus, the calculation speed of the device is maintained without the normally concomitant increase in power consumption.

The base computer 11 ties in with the device 10 across a computer interface 54 in the illustrated embodiment. The preferred interface 54 comprises an RS-232 serial I/O interface. This interface has a plug which is received in a jack located on the back of the device 10. Thus, the base computer 11 can directly interface the device 10 for connecting the data base of the base computer with the device. The base computer loads pertinent information about the machines within a plant to be analyzed. Such information will include, but not necessarily be limited to, the parameters or variables related to pertinent vibration information. The parameters will vary from machine to machine. For example, the parameter may vary with the number of blades of a pump, whether the machine is a reciprocating or rotating machine, etc. Exemplary parameters which will be loaded into the device 10 can be a function of: frequency or vibrations for frequency less than the turning speed; vibrations at multiples of the turning speed; vibrations between 1.25 KHz and 10 KHz; and vibrations between 250 Hz and 1.25 KHz. Normally, six different parameters will be used with respect to each machine. This plant or machine's specific data is loaded into the device 10 and informs the device 10 which data collecting operations it should undertake. This interface is also used after the data has been taken from the machines being analyzed. At that point, the device 10 is again connected with a base computer. The operator causes the base computer to interrogate the device 10 and then the data from the device will be loaded into the base computer for analysis. Thus, all communications between the base computer and the device 10 will be through the interface 54.

The multifunction module 18 also includes a power supply relay controller 56. This device is connected to the power supply board and controls the power supply cutoff relays for de-energizing components of the device not being used. The computer continuously gathers data concerning which components are in operation and de-energizes those which are idle.

A parallel I/O controller 58 is used by the computer to interface the computer with the other components of the meter. Its output comprises digital control signals which go to the various parts of the module including the keyboard, the display, etc.

Figure 5A:
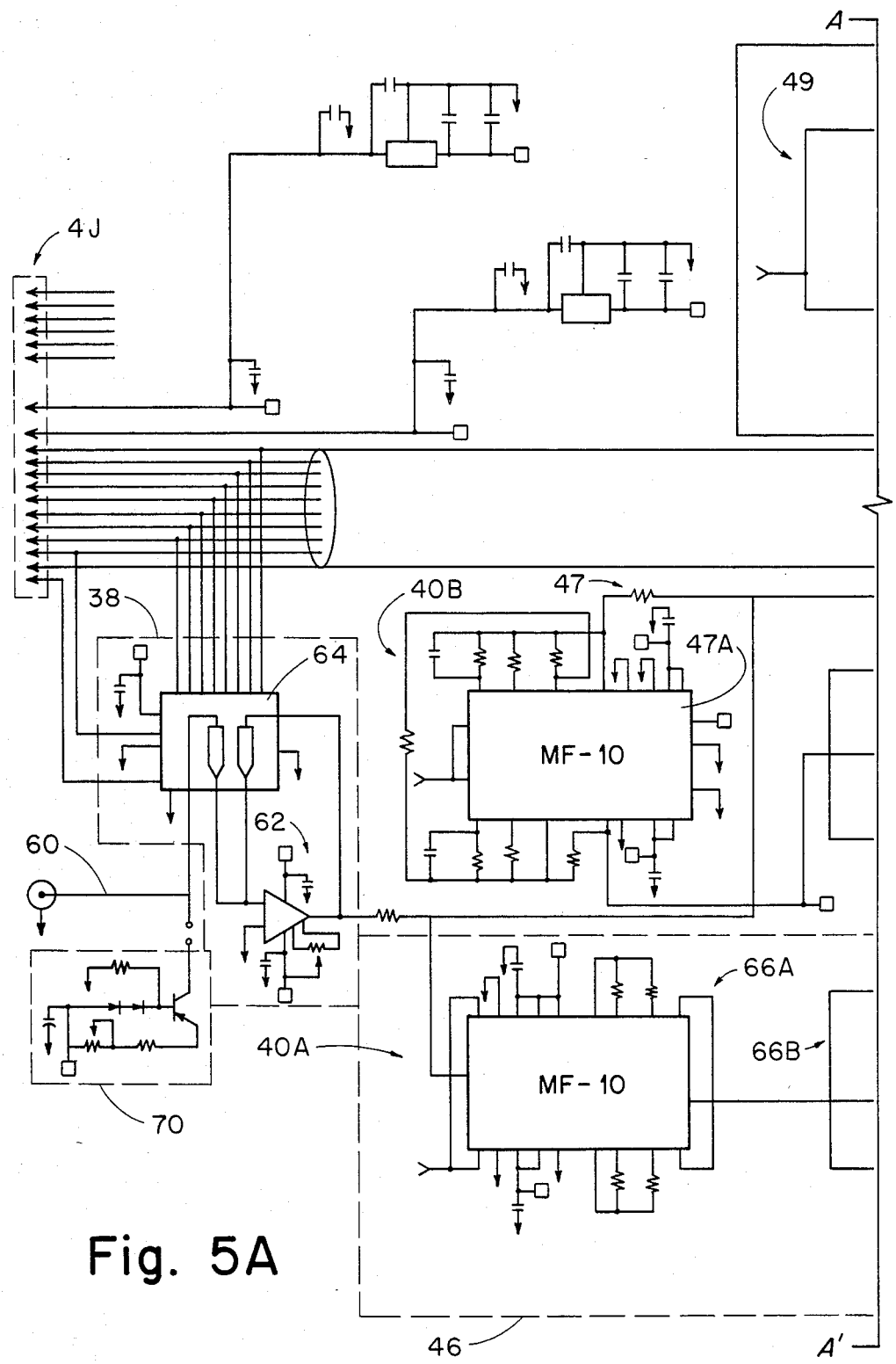
FIGS. 5A and 5B illustrates a schematic diagram of the signal conditioning module illustrated in FIG. 3.
Figure 5B:
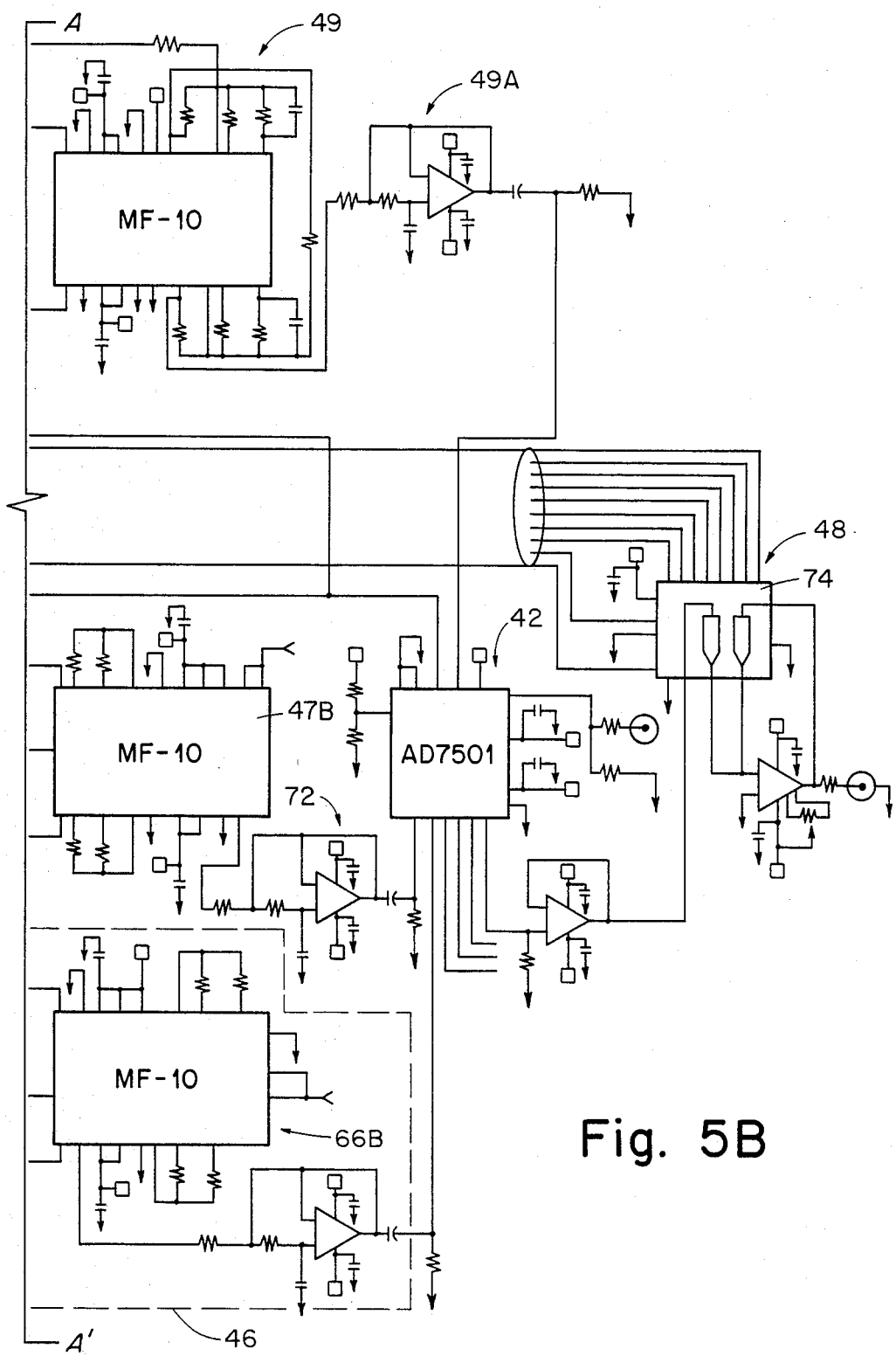

The signal condition module 16 will now be discussed in greater detail and reference will be made to FIGS. 5A and 5B. The input to the signal conditioning module is received through the line 60. This signal is received from the vibration sensor connected to the machine being analyzed. The signal is fed to a digitally controlled amplifier 62. This amplifier is controlled by using a digital-to-analog converter 64 as a feed back resistive network. The output of the amplifier 62 is broken up into four discrete paths as illustrated. One path 40A passes through a low pass anti-aliasing filter generally indicated at 46, and described generally above in connection with the block diagram of FIG. 3. This filter is based upon two successively cascaded switch capacitive filter networks 66A and 66B, such as units including the part identification numbers in FIG. 4 and manufactured by National Semiconductor, a United States company. The cutoff frequency of the switch capacitive filters can be computer controlled. Stage one of the filter 46 comprises the switch capacity filter 66A, and stage two of the filter 46 comprises the switch capacity filter 66B which is cascaded as indicated. The output of the low pass anti-aliasing filter 46 is fed into the low pass filter generally indicated at 68. This low pass filter in a preferred embodiment comprises a two-pole Butterworth filter which serves to remove the spiking transients associated with the switch capacitive filters 66A and 66B. As illustrated in FIGS. 3 and 5, the output of the filter 46, including the low pass filter 68, is fed into the signal selection device generally indicated at 42, which in the preferred embodiment, comprises a multiplexer. This device is a one of eight multiplexer which will choose under computer control, a signal from one of the paths 40A–D to be fed into the digital controlled amplifier 48 (see FIGS. 3 and 5).

The vibration sensor current is fed from the source generally indicated at 70. This current source provides a constant current for the vibration sensor and is implemented by the illustrated transistors and diodes.

Path 40B as seen in FIGS. 3 and 5 is an alternate path through which the signal is fed from the amplifier 38 to the multiplexer 42. This band pass filter 47 comprises cascaded switch capacitive filters 47A and 47B as illustrated in FIG. 5, which serve as the stages of the band pass filter. The filter 47A comprises the high pass stage and the filter 47B comprises the low pass stage. Each filter stage comprises a four-pole capacitive filter networks, in the preferred embodiment, set at preselected frequencies. In the preferred embodiment the frequencies are 250 Hz for the high pass stage and 1.25 KHz for the low pass stage. The output of the low pass stage 47B is fed into a low pass filter generally indicated at 72. This filter is a two-poled Butterworth filter, in the preferred embodiment, and serves to remove spiking which is inherently associated with switch capacitive filters. The output of the filter 72 is fed directly into the signal selecting device or multiplexer 42.

The output of the amplifier 38 can also be fed to the multiplexer 42 through the path 40C and through a high pass filter 49. This filter comprises a switch capacitive filter network set in a high pass mode. The output of this filter is passed through the filter 49A which is designed to remove spiking. The modules 49 and 49A collectively comprise the high pass filter 49 illustrated in FIG. 3. The output of this filter is fed into the multiplexer 42.

As illustrated in FIGS. 3 and 5, the output of the multiplexer 42 is fed into the digital controlled amplifier 48 which includes an operational amplifier 72 which has an eight bit digital-to-analog convertor 74 as a fed back resistive network.

The power control board module 32 serves to supply power to the various components and modules of the device 10. This power control board is connected at its input 78 to the battery pack of the device 10. In the preferred embodiment, this battery pack comprises an unregulated 12 volt battery. Two parallel DC to DC convertors 80 and 80A serve to regulate the voltage used by the power control module. Convertor 80 takes the unregulated 12 volts and supplies plus 5 regulated volts to selected electronic modules of the device. The convertor 80A takes the 12 volts unregulated from the battery and supplies plus and minus 15 volts to the analog-to-digital convertor modules, the serial interface module 54 and other modules on the analog board which require plus and minus 15 volts. It will be noted that the power from the convertors 80 and 80A are fed through relays 82A–C which are used for powering on and off the various modules not in use to conserve power. As illustrated, relay 82A is a dual pole relay and relays 82B and 82C are triple pole relays.

A small battery 84 is used as a backup for the random access memory (RAM) for the device 10 when the power is turned off. This prevents the memory of the device from being lost if the power is turned off. The transistor circuit generally indicated at 86 provides an inhibit signal for the computer which prevents the computer from writing into its memory as the computer is powering up. If the computer is not inhibited from writing into the memory which is backed up by battery, the computer will generate spurious information as it is powered up. When the power stablizes the random access memory is enabled such that the computer can then write into its memory.

Figure 6A:
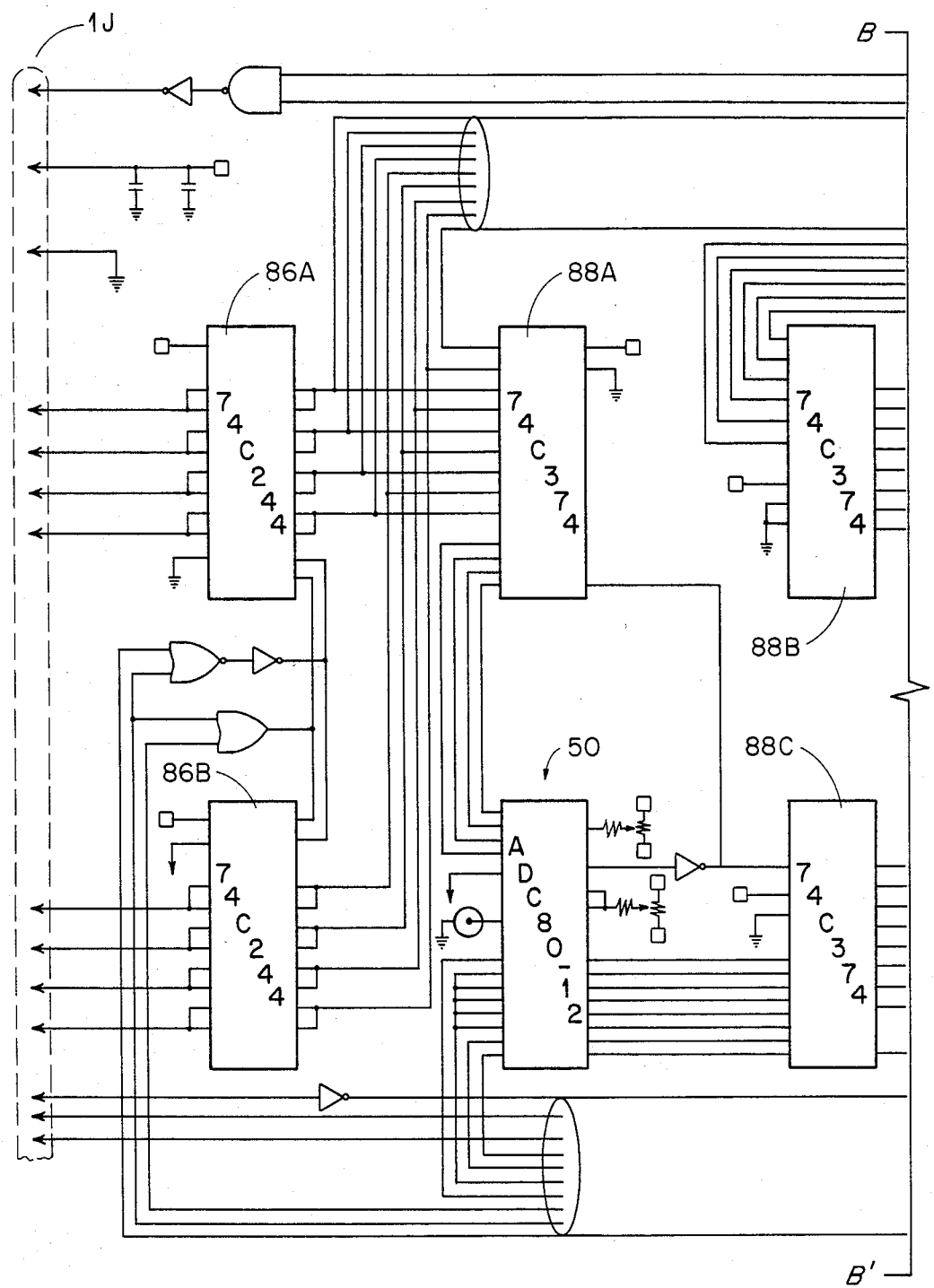
FIGS. 6A, 6B and 6C illustrates a schematic diagram of the multifunction I/O module illustrated in FIG. 4.
Figure 6B:
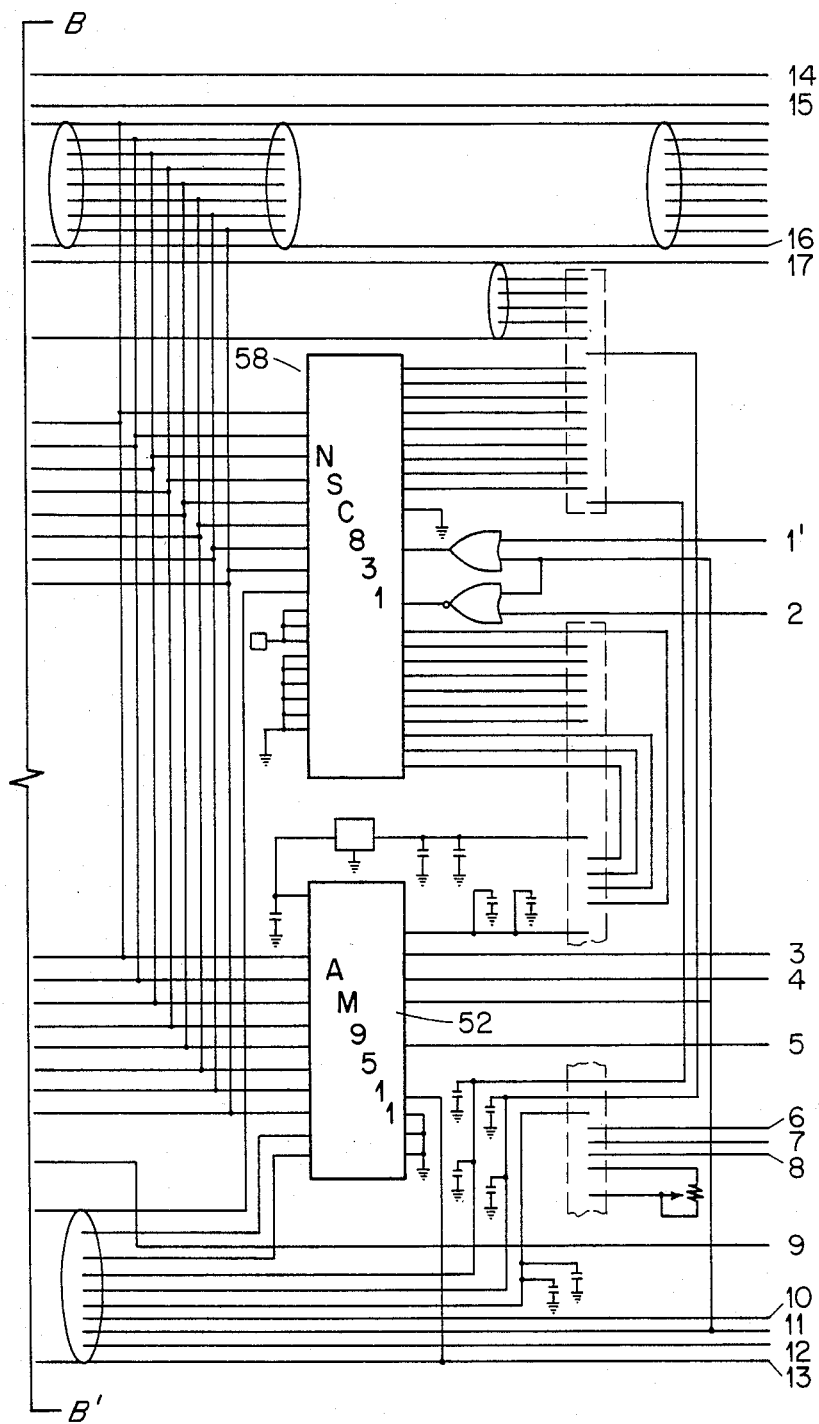

The schematic of the multifunction module 18 is illustrated in FIGS. 6A and 6B. This module includes two data buffer interface chips 86A and 86B which allow the bus to be buffered from the computer. This prevents interference during the powering down operations. An analog to digital convertor is generally indicated at 50, and one suitable device is manufactured by Analog Devices with the part number illustrated. Most of the chips can be purchased from Texas Instruments and/or National Semi-Conductor.

Interface chips 88A, B and C allow the analog to digital convertor 50 to interface the bus. The buffer 88C buffers the data onto the data bus from the analog-to-digital convertor. This is a tri-state buffer such that when it is enabled with a memory read, data goes on to the data bus.

The parallel I/O controller 58 serves to supply the digital control signals to various other components of the meter.

The high speed math processor 52 performs very quick floating point calculations. This device is selectively energized with the various other modules to reduce power consumption.

Figure 6C:
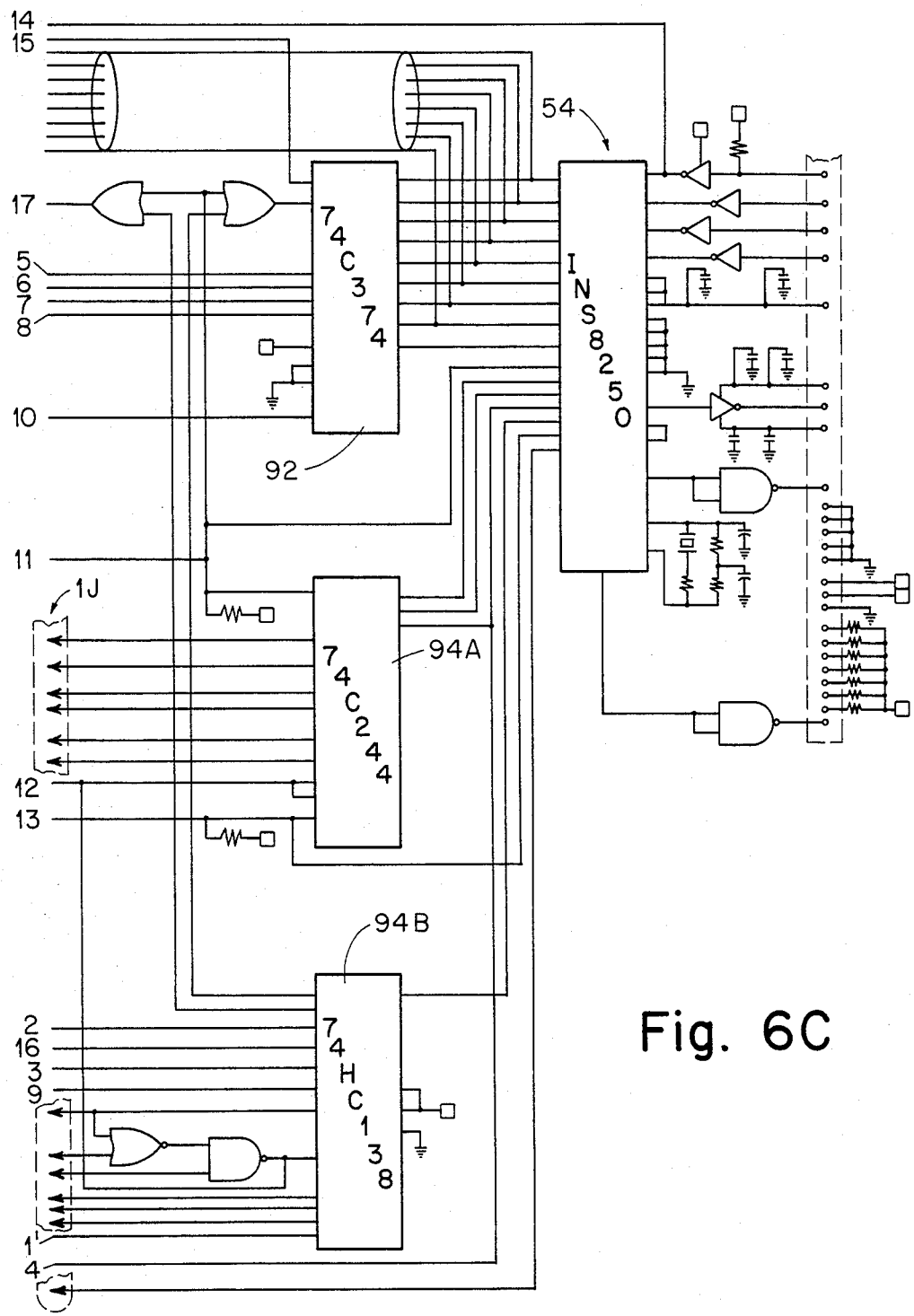
Figure 7:
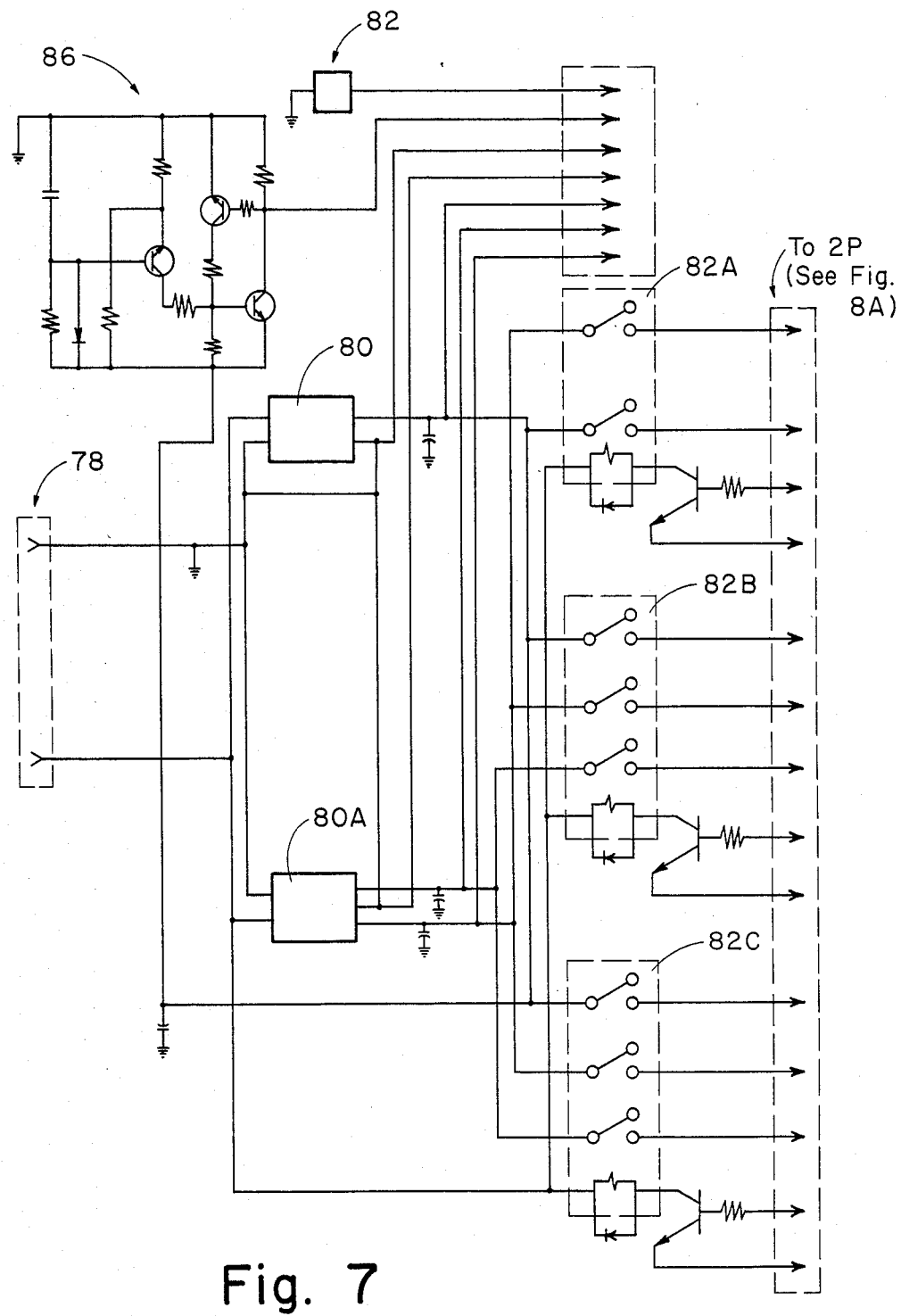
FIG. 7 illustrates a schematic diagram of the power control module illustrated in FIG. 2.

The serial I/O interface is generally indicated at 54. This chip as indicated in FIG. 6 interfaces the device 10 with a standard serial interface, such as the RS 232. Thus, this chip serves as the computer interface link. It includes its internal baud rate generator which is capable of selecting the data communication bit rate.

The chip 92 serves as a latch to provide several parallel output signals. The chips 94A and 94B serve as part of the address decoding circuitry used to decode the I/O addresses to the other devices.

The software which controls the operation of the device 10 and its microprocessor 12 is located in electronically erasable read only memory indicated at 24 in FIG. 2. The software is written in assembly language, such as Z80 assembly language in the preferred embodiment, and is structured according to the flow diagrams presented in FIGS. 9–12.

The operation of the device 10 is controlled by its "operational mode", which is a memory location stored in the random access memory (RAM) 26 (see FIG. 2). There are three principal modes of operation of the device 10. These modes are designated in the flow diagrams as MODE-0, MODE-1 and MODE-2. The numerals will now refer to the various steps or flags in the program flow depicted in FIGS. 9–12. After power-up initialization 110, program execution is transferred to the start of the "monitor loop" 112 illustrated in FIG. 9. This loop determines the current operational mode and jumps to a separate processing routine for each mode. The monitor loop is an endless loop and is re-entered following completion of all functions in each processing routine. Changes in operational modes are not recognized until the beginning of the monitor loop.

Figure 8:
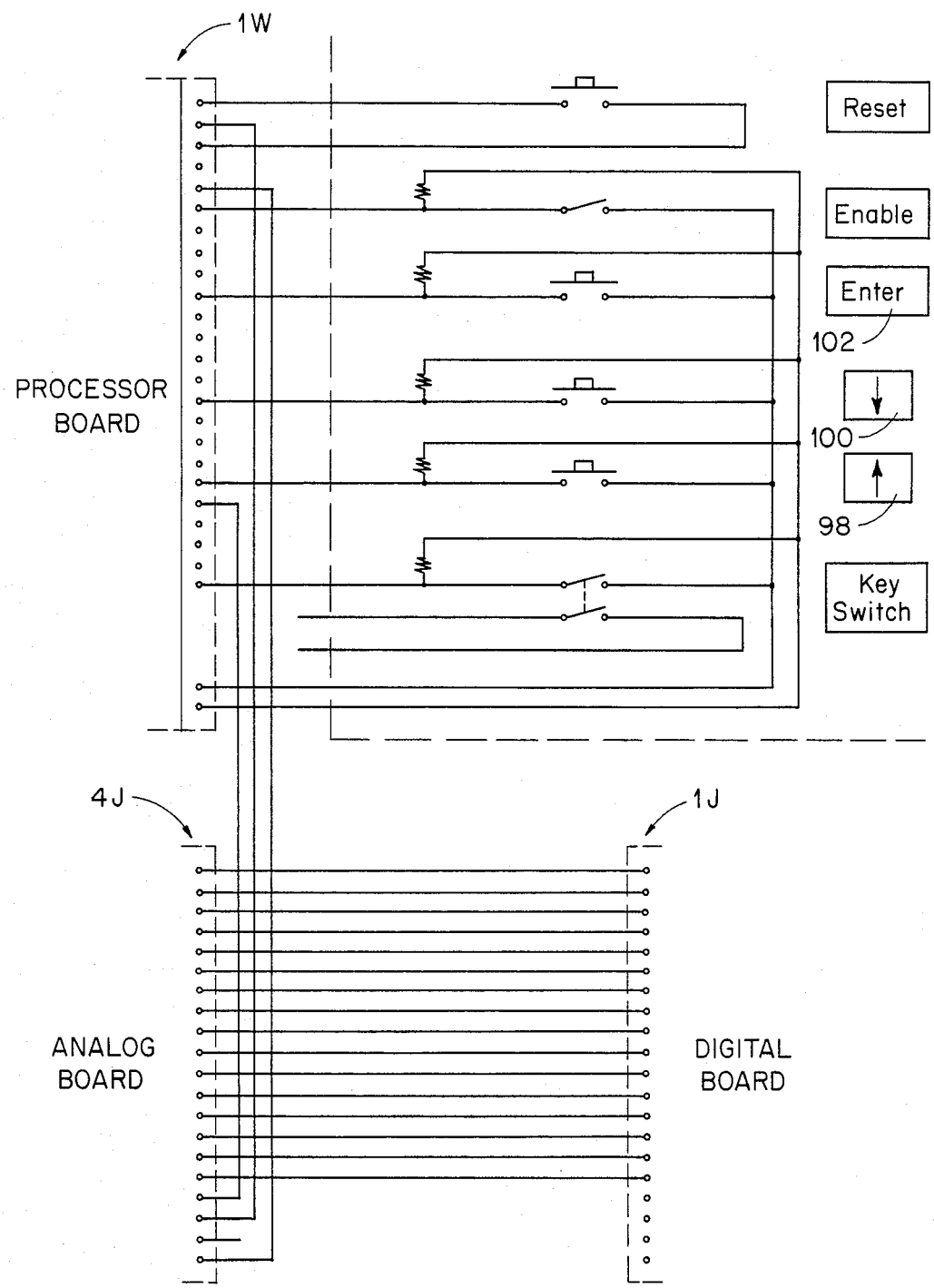
FIG. 8 illustrates a schematic diagram of the circuitry operatively associated with the keys mounted on the front panel of the device illustrated in FIG. 1.

The normal mode of operation consist of the MODE-0 114 in the flow diagrams. This MODE-0 is set during the power-up initialization of the microprocessor. In this mode, the device 10 displays 116 (see FIG. 10) on the display 28, the currently selected measurement point on the left LCD and display blanks out the right LCD display, and scans the keypad 118 for operator commmands. There are basically four operator commands which are recognized in MODE-0; (1) the up-arrow command 120 caused by depressing key 98 (see FIGS. 18, and 10) (FIG. 8 illustrates the cable interconnect position directly behind the front panel of the device illustrated in FIG. 10.) This up-arrow command results in an incrementation 122 of the currently selected measurement point number which is stored in the random access memory 26; (2) the down-arrow command 124 which results from depressing key 100 and causes the decrementing 128 of the currently selected measurement point number; (3) the enter command 126 results in indicating data collection and analysis; and (4) the extended enter command 130 results in setting the operational mode to MODE-1 132 which will be described hereinafter. Program execution is transferred to the start of the monitor loop whenever either one or two conditions are met, namely (1) the keyboard scan indicates no keys have been pressed 134 or (2) the function previously initiated by a key command has been completed.

The diagnostic mode of operation is generally used by a skilled technician or vibrations engineer and allows the operator to trouble shoot equipment being analyzed. Its functions allows the operator to calculate and use the instrument for in-situ analysis. The diagnostic mode or MODE-1 on the flow chart 11 is set whenever an extended enter command is pressed in MODE-0. In MODE-1 136 the instrument displays the "diagnostic menu" 138 in the right section of the LCD display. This menu consist of four selections in the preferred embodiment each of which correspond to a special, "diagnostic" function. A diagnostic function is selected by moving a block cursor, by the up-arrow and down-arrow (see locations 140 and 142, respectively, in FIG. 11) keys to point to the desired function and then pressing the enter key 102 (see location 144 in FIG. 11). Each of the diagnostic functions are implemented by a separate software module labelled DIAGF1, DIAGF2, DIAGF3 and DIAGF4 (see FIG. 11). The routine scans the keyboard for the up-arrow and the down-arrow keys and moves the block cursor accordingly. When the enter key is detected, the current cursor position flag, stored in the random access memory 26, is used to indicate which of the four diagnostic modules should be called. Upon returning from the diagnostic module, the routine redraws the diagnostic menu and continues execution at the monitor loop. The only mechanism for exiting MODE-1 operation is by initiating a hardware reset of the microprocessor 12. This results in execution at the power-up entry point which resets the operational mode flag to MODE-0.

Figure 12:
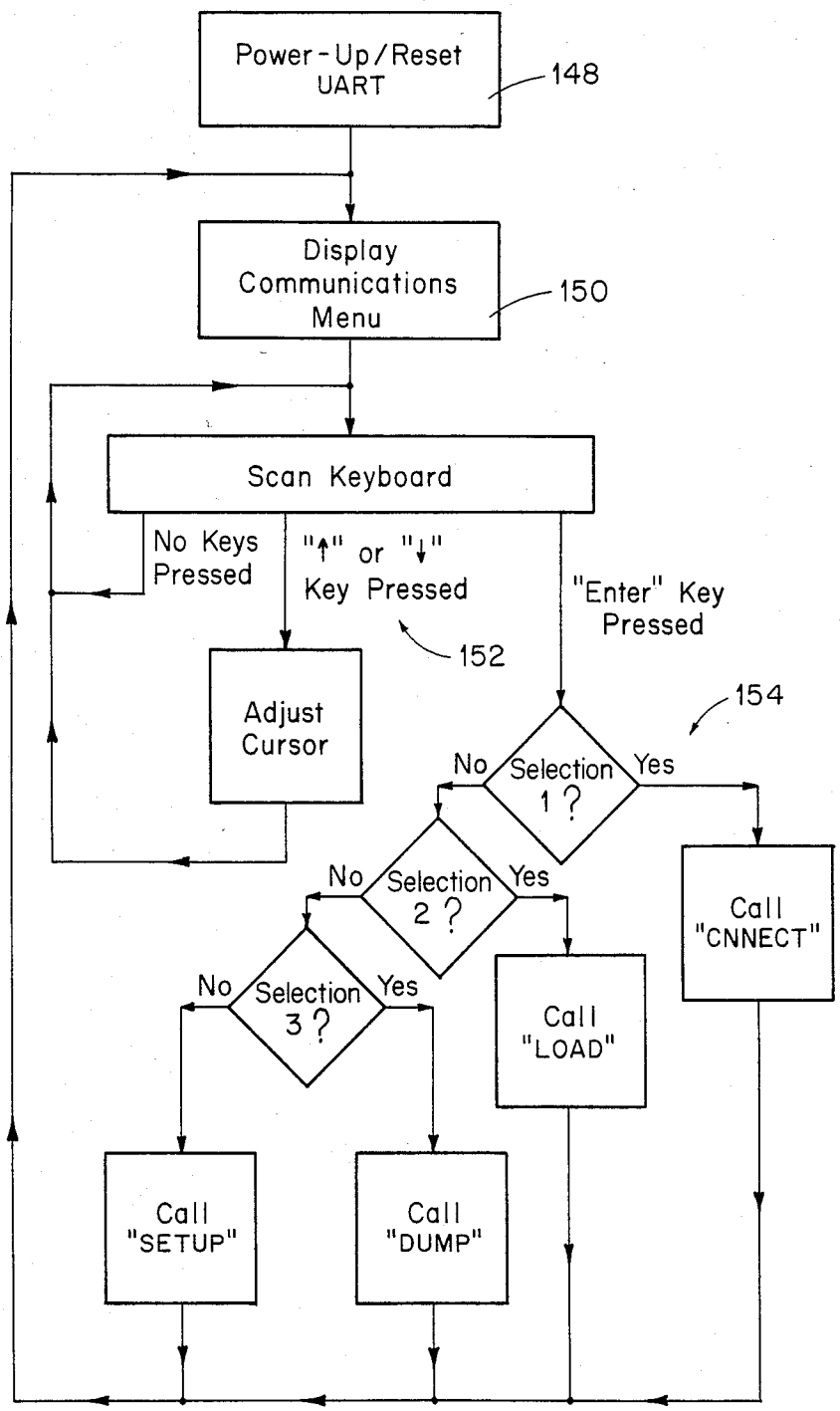
FIG. 12 illustrates the flow of the remote mode on MODE-2 operation.

The remote mode, that is MODE-2 illustrated in FIG. 12 at 147, operation is initiated when the serial interface 54 cable has been connected in the rear of the instrument as described above. This connection results in the assertion of a logic true signal on the received data line of the receiver/transmitter within the device 10. This signal provides an interrupt to the processor 12 which causes automatic initiation 148 of an interrupt service routine. The interrupt service routine sets the operational mode flag to MODE-2, masks the interrupt signal, and initiates a return from interrupt. When the instrument senses the mode flag indicating MODE-2 operation, which is at the start of the monitor loop, a jump is made to the MODE-2 entry point. This routine initiates a power-up of the receiver/transmitter and sets the communications parameters to the values currently stored in the random access memory 26. The receiver/transmitter is set to interrupt on the modem status change signals to an interrupt service routine which results in execution of the power-up entry point and a return to a MODE-0 operation. This results in a return to MODE-0 operation whenever the connector of the serial I/O interface 54 is unplugged or whenever the data-set-ready or clear-to-send signals become inactive. In MODE-2 operation, the "comaunications" menu 150 is displayed in the right LCD display. This menu consists of a list of four items which are selected by positioning the block cursor 152, via up-arrow and down-arrow keys, to indicated the desired function and pressing the entry key. Each of the four communication functions are implemented by a separate software module illustrated generally at 154. The selected module is called directly after the enter key is detected. The communication menu is redrawn and MODE-2 operation continues when the module returns.

Figure 8A:
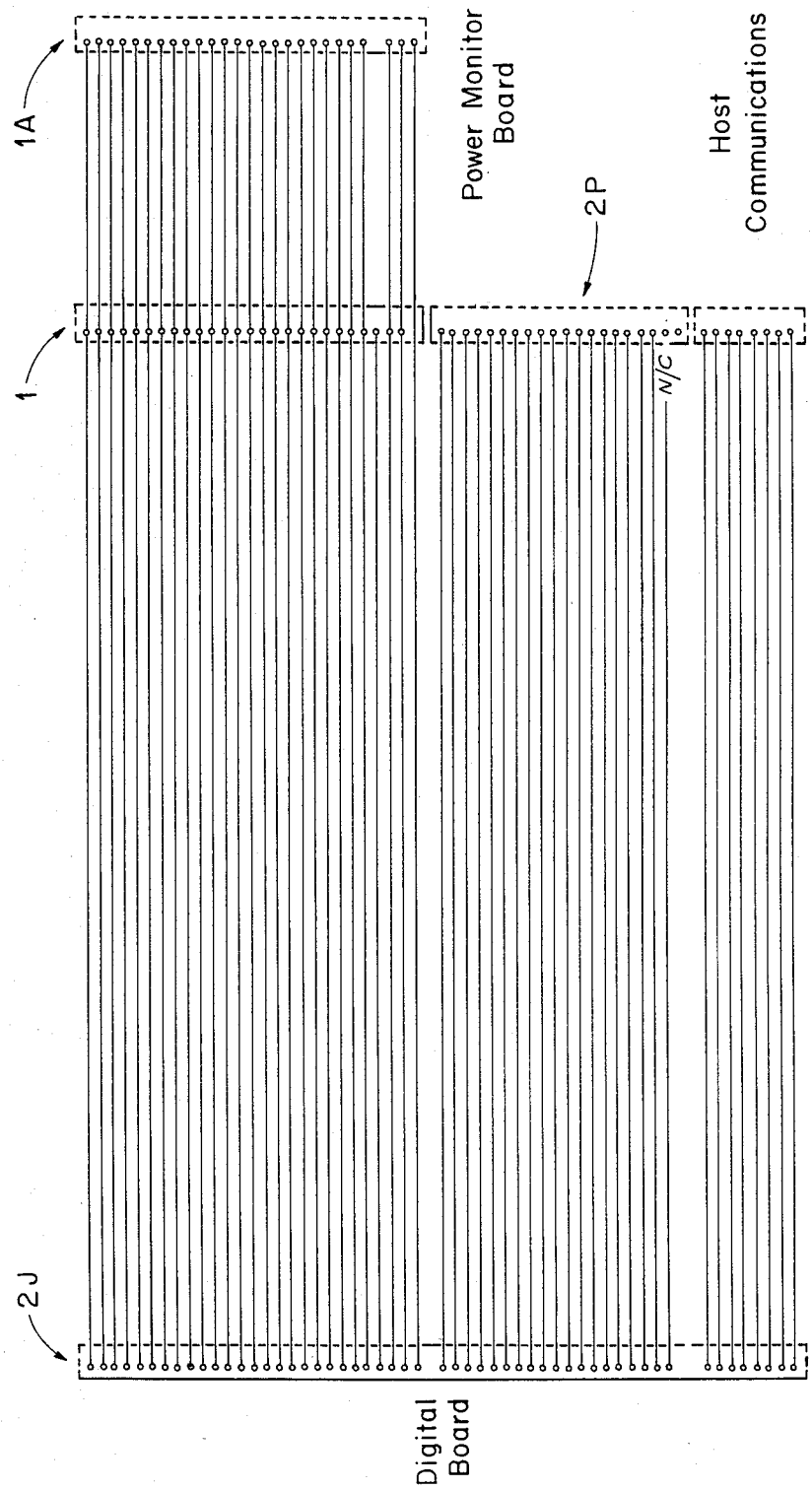
FIG. 8A illustrates certain module interconnects.
Figure 9:
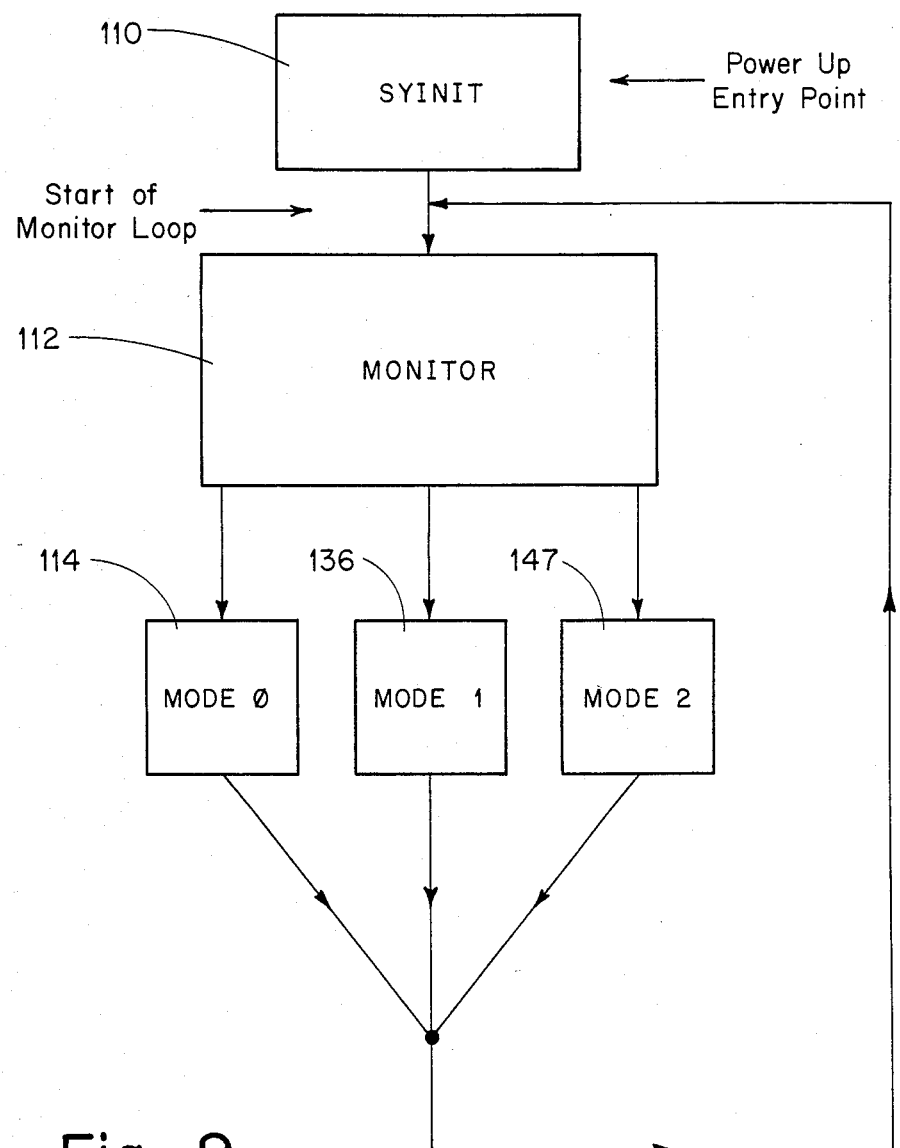
FIG. 9 illustrates an overall flow diagram of the instrument software.
Figure 10:
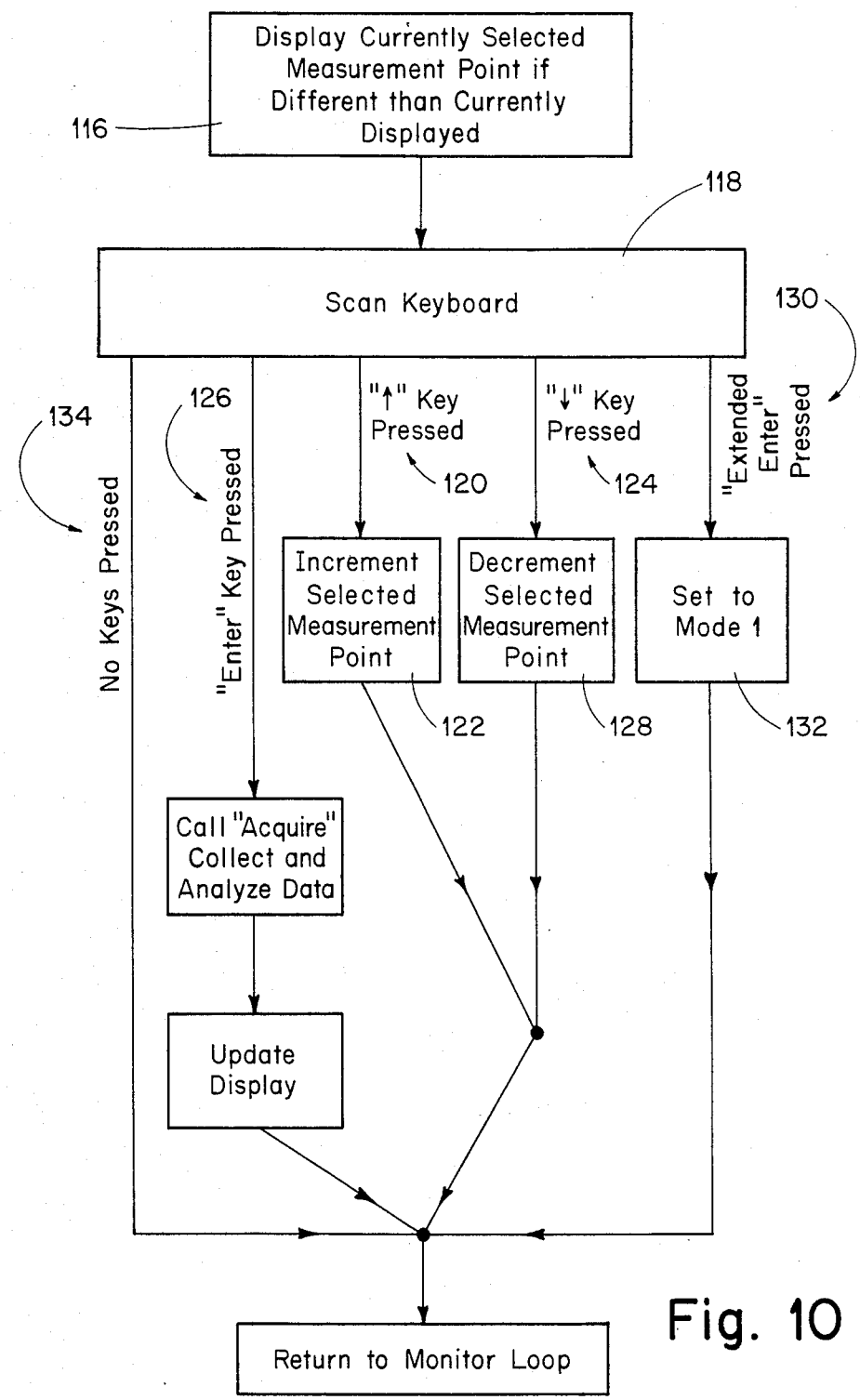
FIG. 10 depicts the flow of the normal mode or MODE-0 operation.
Figure 11:
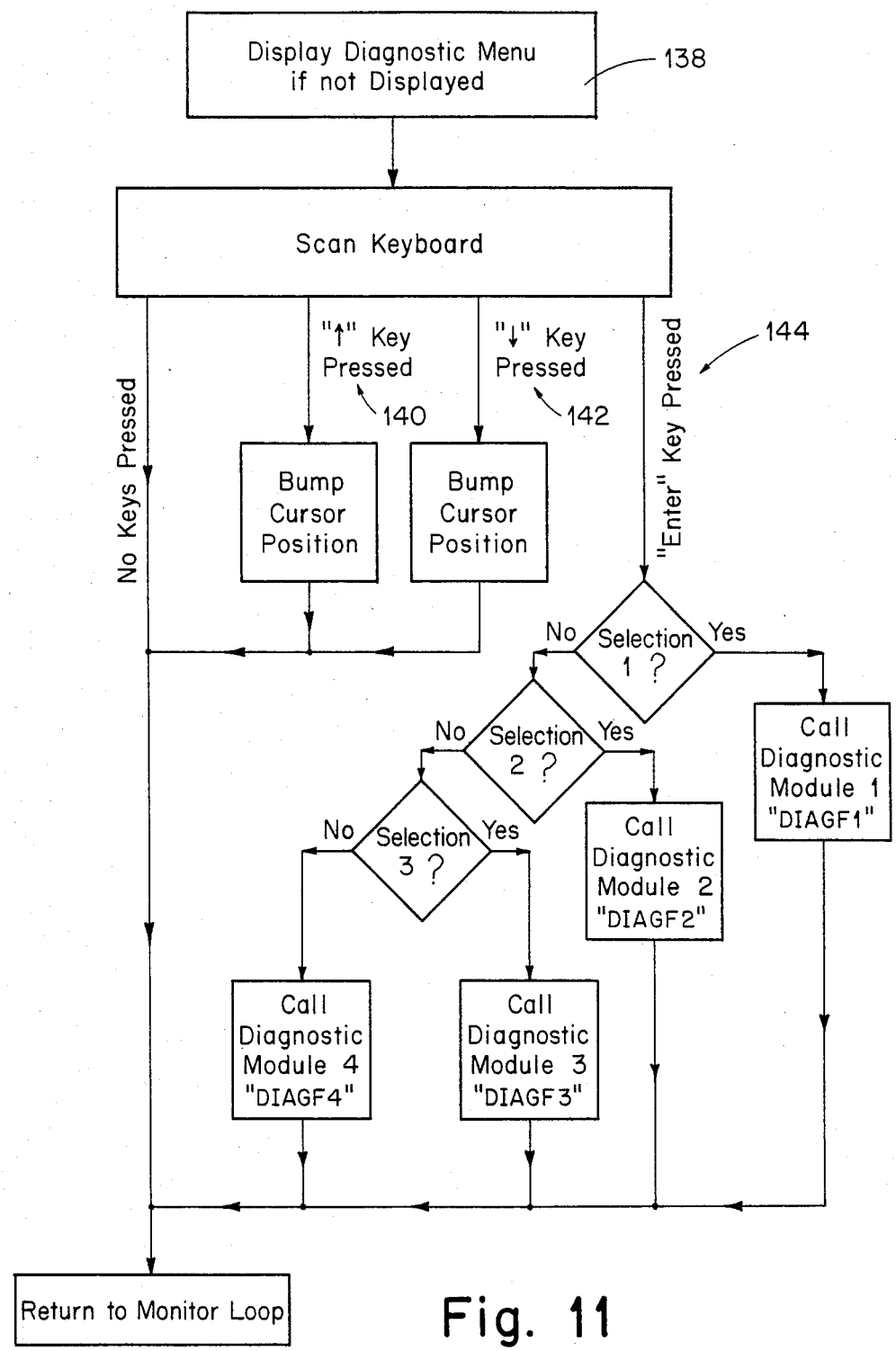
FIG. 11 depicts the flow of the diagnostic mode or MODE-1 operation.

The interfacing of the various boards and components of the device which will be apparent to those skilled in the art, will now be discussed. The analog board is interfaced to the multifunction I/O board by a 20 pin ribbon cable 4J which is connected with the 1J interconnect as seen in FIG. 8. Connector 4J routes three signals to the processor board on connector 1W (see FIG. 8). The power monitor board is interconnected to the multifunction I/O module through the 20 pin ribbon connector 2P to connector 2J (see FIG. 8A). Connector 2J is also used to interconnect the multifunction I/O module to the displays 28 at the location 1 and 1A on the schematic of FIG. 8A. This connector 2J also connects the serial I/O interface 54 on the rear portion of the device 10.

In accordance with one feature of the invention, the vibration signature data is compressed or condensed prior to being stored in memory in order to reduce the memory required by the device. More specifically, preselected frequency band identifiers are setup in the data base of the base computer and loaded into the device 10. By applying a frequency integration over specific bands, 12 bytes can be used to accurately represent frequency resolution which normally requires 256 bytes which is the acceptable size for a Fourier transform to procure a frequency resolution. Thus, this frequency domain integration of the vibration signature over preselected frequency bands (6 frequency bands are used in the preferred embodiment) enables the data compression.

From the foregoing detailed description, it will be recognized that an improved vibration monitoring device has been described and illustrated. The device is used in conjunction with a base computer of conventional design which stores specific information concerning the machines about which vibration data is to be collected. Moreover, preselected parameters are determined, in the preferred embodiment, by the base computer for each machine upon which measurements are to be made. These parameters are selected to minimize the amount of data that must be stored to provide reliable vibrational analysis. The device includes a signal conditioning module which incorporate an anti-aliasing filter unique to vibration monitoring. Further, the various sections or modules of the unit are selectively energized and de-energized to reduce power consumption. In this connection, the device portability and operational speed is enhanced without the usual trade-offs of power consumption associated with microprocessor base devices capable of rapid mathematical analysis. The meter is designed to be used by an unskilled technician, and the operator interface is very simple. Preferably the interface includes three keys, and by using the up-arrow, down-arrow and "enter" keys and by following the meter's prompts, a nontechnical operator can consistently obtain accurate and repeatable predictive maintenance data. Moreover, the meter will display an amplitude-vs-frequency signature of the incoming machine vibration signed.

It is, of course, understood that although preferred embodiments of the present invention have been illustrated and described, various modifications thereof will become apparent to those skilled in the art and, accordingly, the scope of the present invention should be defined only by the appended claims and equivalents thereof.

We claim:

1. A portable vibration monitoring device for use in connection with a base computer which stores data regarding the nature and parameters of vibration measurements to be made on preselected machines by such device, said device comprising:

power supply means;

a vibration sensor which produces an analog signal representative of selected vibration of said machine upon mechanically connecting said sensor with said machine at preselected measurement points thereon;

signal conditioning means for conditioning said analog signal generated by said vibration sensor, said signal conditioning means including anti-aliasing means for filtering preselected frequencies from said signal generated by said sensor to enhance the accuracy of the data collected;

means connected with the output of said signal conditioning means including multiple modules which are selectively energized, one of said modules comprising high speed math processor means;

processing means for selectively energizing said modules for purposes of reducing power consumption, for loading and retrieving information and instructions, and for selectively employing said anti-aliasing means for analysing digital information concerning vibration data stored in said device and for selectively interfacing with an operator by causing information to be displayed, and for controlling the various operational modes of said device;

means operably connected to said processing means for entering and loading instructions and information for controlling the operation of said device;

first memory means for storing operating instructions for use by said processing means; and further memory means for storing data collected by said device from preselected locations upon said machines.

2. The device of claim 1 wherein said anti-aliasing means comprises a digital controlled low pass anti-aliasing filter including a switch capacitive filter.

3. The device of claim 2 wherein said anti-aliasing filter comprises a pluarality of cascaded switch capacitive filters and means for eliminating transient spikes generated by said switch capacitive filters.

4. The device of claim 1 wherein said signal conditioning means includes in addition to said anti-aliasing means, parallel paths through which the unconditioned sensor signal is selectively passed, one such path including a band pass filter, and a further such path including a high pass filter.

5. The device of claims 1 wherein said means connected with the output of said signal conditioning means including multiple modules which are selectively energized includes I/O interface means for interfacing said device with said base computer to enable said base computer to selectively load said device with information regarding data to be collected and receive data collected by such device for purposes of analysing such data for predictive maintenance purposes.

6. The device of claim 1 wherein said means connected with the output of said signal conditioning means including multiple modules which are selectively energized including analog-to-digital converter means for digitizing said conditioned vibration signal, and power supply relay controller means for selectively energizing and de-energizing components of said device for purposes of reducing power consumption when said components are idle.

7. The device of claim 1 including display means operably connected with said processing for selectively providing a visual read out of selected information concerning the operation of said device and the data collected from machines.

8. The device of claim 7 wherein said display means provides a visual read out of the measurement point on said machine, and the frequency of the vibration measurement being made.

9. The device of claim 1 wherein said means operably connected with said processing means for entering and loading instructions and information comprises a plurality of keys.

10. The device of claim 1 including means for condensing vibration signature data prior to storing such data in said further memory means.

11. The device of claim 10 wherein said means for condensing said vibration signature data integrates the vibration signature in the frequency domain over preselected frequency bands prior to storing the results of such integrations in said further memory.

12. A portable vibration monitoring device for use in connection with a base computer which stores data regarding the nature and parameters of vibration measurements to be made on preselected machines by such device, said device comprising:
   power supply means;
   a vibration sensor which produces an analog signal representative of selected vibration parameters of said machine upon mechanically connecting said sensor with said machine at preselected measurement points thereon;
   signal conditioning means for conditioning said analog signal generated by said vibration sensor, said signal conditioning means including a plurality of parallel paths through which the unconditioned sensor signal is selectively passed, one such path including anti-aliasing means for filtering preselected frequencies from said signal generated by said sensor to enhance the accuracy of the data collected, a further such path including a band pass filter, and yet another path including a high pass filter;
   means connected with the output of said signal conditioning means including multiple modules which are selectively energized, one of said modules comprising high speed math processor means; another of said modules comprising I/O interface means for interfacing said device with said base computer to enable said base computer to selectively load said device with information regarding data to be collected and received data collected for purposes an analysing such data for predictive maintenance purposes, and yet another module comprising an analog to digital converter for digitizing said conditioned vibration signal; and
   processing means for selectively energizing said modules for purposes of reducing power consumption, for loading and retrieving information and instructions, for selectively employing said anti-aliasing means, for analysing digital information concerning vibration data stored in said device and for selectively interfacing with an operator by calling for information to be displayed and for controlling the various operational modes of said device;
   means operably connected with said processing means for entering and loading instructions and information for controlling the operation of said device;
   first memory means for storing operating instructions for use by said processing means; and
   further memory means for storing data collected by said device from preselected locations upon said machines.

13. The device of claim 10 wherein said anti-aliasing means comprises a digital controlled low pass anti-aliasing filter including a switch capacitive filter.

14. The device of claim 9 wherein said anti-aliasing filter comprises a plurality of cascaded switch capacitives filter and means for eliminating transient spikes generated by such capacitive filters.

15. The device of claim 12 including means for condensing vibration signature data prior to storing such data in said further memory means.

16. The device of claim 15 wherein said means for condensing said vibration signature data integrates the vibration signature in the frequency domain over preselected frequency bands prior to storing the results of such integrations in said further memory.

* * * * *